United States Patent [19]

Hwang

[11] Patent Number: 5,966,119
[45] Date of Patent: Oct. 12, 1999

[54] PSEUDO-SYNCHRONIZING SIGNAL GENERATOR FOR USE IN DIGITAL IMAGE PROCESSING APPARATUS

[75] Inventor: Ho-Dae Hwang, Seoul, Rep. of Korea

[73] Assignee: SamSung Electronics Co., Ltd., Kyungki-do, Rep. of Korea

[21] Appl. No.: 08/759,598

[22] Filed: Dec. 5, 1996

[30] Foreign Application Priority Data

Dec. 5, 1995 [KR] Rep. of Korea .................. 95-46724

[51] Int. Cl.$^6$ ........................................... H04N 5/04
[52] U.S. Cl. ..................... 345/213; 345/121; 345/123; 348/511
[58] Field of Search ................................. 345/121, 213, 345/123; 348/511, 530, 531

[56] References Cited

U.S. PATENT DOCUMENTS

| | | | |
|---|---|---|---|
| 3,742,288 | 6/1973 | Albrecht et al. ................. | 345/121 |
| 4,736,162 | 4/1988 | Ishihara . | |
| 5,414,470 | 5/1995 | Hotta et al. ..................... | 348/530 |
| 5,631,709 | 5/1997 | Lam et al. ...................... | 348/531 |
| 5,790,112 | 8/1998 | Hwang ............................ | 345/213 |
| 5,805,151 | 9/1998 | Hwang ............................ | 345/213 |

*Primary Examiner*—Bipin H. Shalwala
*Assistant Examiner*—Vincent E. Kovalick
*Attorney, Agent, or Firm*—Robert E. Bushnell, Esq.

[57] ABSTRACT

A pseudo-synchronizing signal generator for use in a digital image processing apparatus is disclosed. The pseudo-synchronizing signal generation circuit comprising a pulse generating circuit for generating a train of predetermined pulses as being a dot clock oscillation signal for use with a digital image processing apparatus in response to a synchronizing signal input from an external source, a counting controller disposed to input a program data signal for synchronizing the program data signal with a pulse output by the pulse generating circuit and for outputting a program data enable signal, a down counter enabled by the program data enable signal synchronized with the clot clock oscillation signal so as to count down from a preset value, a detector for detecting when the down counting operation of the down counter reaches zero for generating a disable signal to be applied to the down counter and for generating a first pseudo-synchronizing signal, and a multiplexer to selectively outputting, as a second pseudo-synchronizing signal, a selected one of the first pseudo-synchronizing signal and the horizontal synchronizing signal in responsive to the program data signal. As a result, the circuit is able to generate a pseudo-synchronizing signal having a predetermined delay time duration with respect to its inherent synchronizing signal, in synchronization with a train of dot clock oscillation signal, thereby enabling a digital image processing apparatus to perform a positioning of a pictorial image being display on a variable visual monitor.

9 Claims, 6 Drawing Sheets

FIG. 6A CLK
FIG. 6B H-SYNC
FIG. 6C P61
FIG. 6D P62
FIG. 6E P63

FIG. 7

PSEUDO-SYNCHRONIZING SIGNAL GENERATOR FOR USE IN DIGITAL IMAGE PROCESSING APPARATUS

CLAIM OF PRIORITY

This Application makes reference to, incorporates the same herein, and claims all benefits accruing under 35 U.S.C. §119 from an application for *A Pseudo-Synchronizinging Signal Generation for A Use With Digital Image Processor* earlier filed in the Korean Industrial Property Office on Dec. 5, 1995 and there duly assigned Serial No. 95-46724/1995 by that Office.

FIELD OF THE INVENTION

The present invention relates, in general, to a circuit for a digital image processor and more particularly, to pseudo-synchronizing signal generator for use in a digital image processing apparatus, for generating a pseudo-synchronizing signal that is used for alteration of variable image positioning.

BACKGROUND OF THE INVENTION

Contemporary practice in the art typically uses a synchronizing signal alteration method for image positioning in an image processing apparatus. Positioning of a video signal being visually displayed on a variable visual monitor, such as a cathode ray tube, is altered by electrical operation of a synchronizing signal. The positioning of a raster is substantially shifted according to phases of both horizontal and vertical synchronizing signals in the directions of up, down, left and right, with respect to the frame angle of a display. Upon positioning adjustment of a video signal being visually displayed on a monitor by user manipulation, it is required to generate and utilize a pseudo-synchronizing signal whose phase has been shifted with respect to the phase of its inherent synchronizing signal. Generally, generation a pseudo-synchronizing signal having a different phase with respect to its inherent synchronizing signal, such as a horizontal or vertical synchronizing signal assumed to be applied from an external source, incorporates a pair of monostable multivibrators, respectfully synchronized with a rising edge of an input signal and with a failing edge of an input signal, thereby generating a pulse having a predetermined pulse width. Such pseudo-synchronizing signal such as a cathode ray tube. It is well known in the art regarding circuits for generating pseudo-synchronizing signals to be improper to adopt such pseudo-synchronizing signal generating circuits for use in a digital signal display apparatus, especially in a liquid crystal display. Upon applying a pseudo-synchronizing signal from a conventional circuit apparatus, an asynchronous phenomenon between a pseudo-synchronizing signal and a video dot clock signal occurs thereby causing a failure to the apparatus.

Shuji Ishihara describes a *Timing Pulse Generator For Generating Timing Pulses Synchronized With The Horizontal Synchronizing Signal In A Video Signal* in U.S. Pat. No. 4,736,162 for controlling the positioning of an image to be superimposed on a video image. Ishihura does not contemplate generating a second pseudo-synchronizing signal as a selected one of a first pseudo-synchronizing signal and a horizontal synchronizing signal in responsive to a program data signal.

SUMMARY OF THE INVENTION

Accordingly, it is an object of the present invention to provide an improved pseudo-synchronizing signal generator.

It is another object of the present invention to provide a pseudo-synchronizing signal generation circuit for use with a digital image processor.

It is still another object to provide an improved pseudo-synchronizing signal generator for use with a computer system driving a variable visual monitor.

It is yet another object to provide a pseudo-synchronizing signal generation circuit, for use in a digital image processing apparatus, capable of generating a pseudo-synchronizing signal having a different phase with respect to its inherent synchronizing signal.

To achieve these and other objects, there is provided a pseudo-synchronizing signal generation circuit comprising a pulse generating circuit for generating a train of predetermined pulses as being a dot clock oscillation signal for use with a digital image processing apparatus in response to a synchronizing signal input from an external source, a counting controller disposed to input a program data signal for synchronizing the program data signal with a pulse output by the pulse generating circuit and for outputting a program data enable signal, a down counter enabled by the program data enable signal synchronized with the clot clock oscillation signal so as to count down from a preset value, a detector for detecting when the down counting operation of the down counter reaches zero for generating a disable signal to be applied to the down counter and for generating a first pseudo-synchronizing signal, and a multiplexer to selectively outputting, as a second pseudo-synchronizing signal, a selected one of the first pseudo-synchronizing signal and the horizontal synchronizing signal in responsive to the program data signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
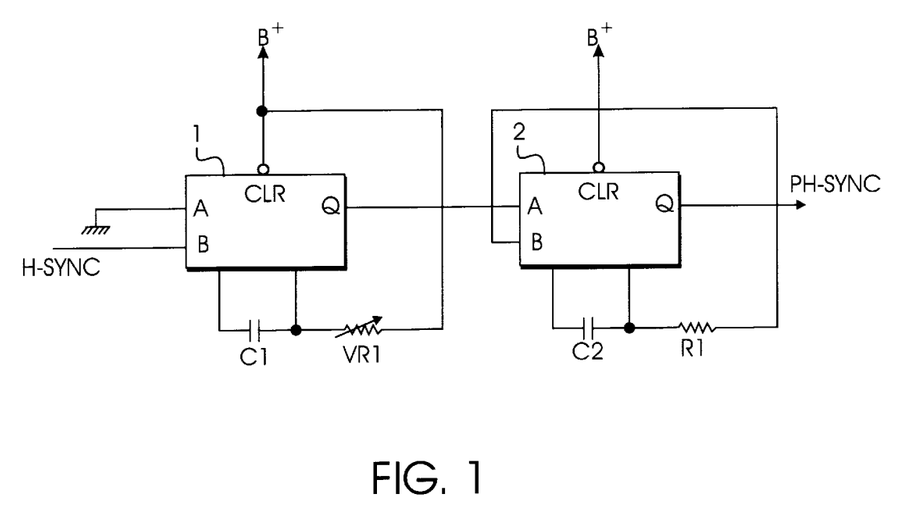
FIG. 1 is schematic block diagram illustrating one example of a pseudo-synchronizing signal generation circuit utilizing a pair of flip-flops.
Figures 2A, 2B, 2C:
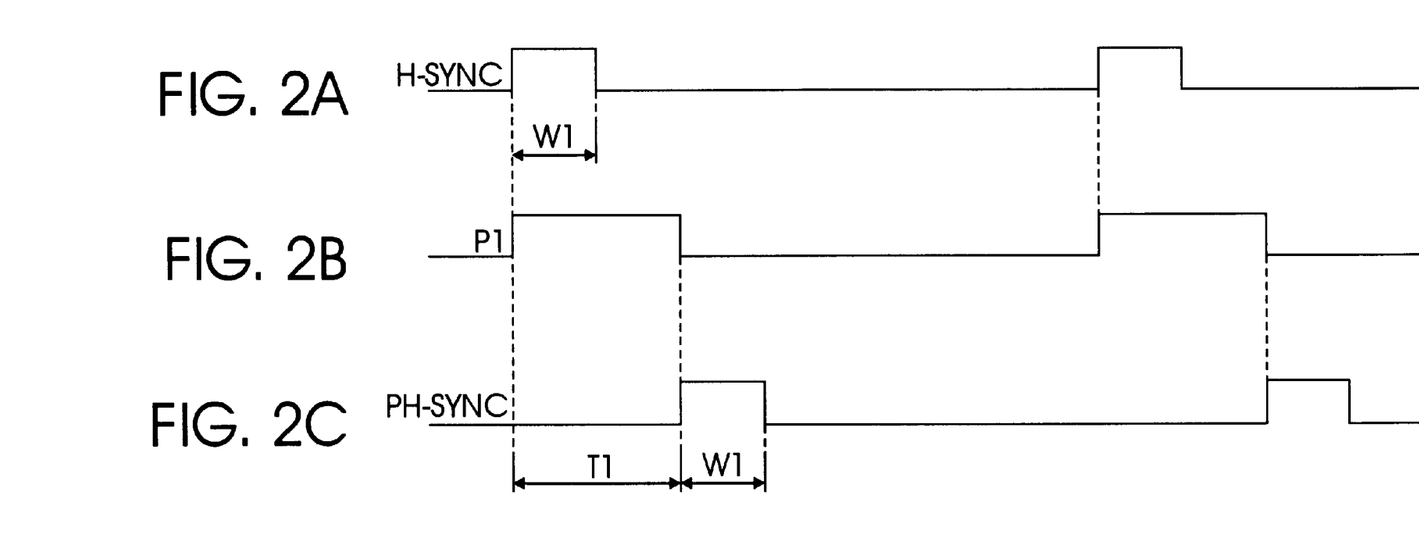
FIG. 2 illustrates various exemplary waveforms corresponding to the circuitry of the examplary pseudo-synchronizing signal generation circuit of FIG. 1.

A pseudo-synchronizing signal generation circuit, as shown in FIG. 1, incorporates a pair of monostable multivibrators 1 and 2 for generating a pulse having a predetermined pulse width. A horizontal synchronizing signal H-SYNC, having a pulse width W1 as illustrated in FIG. 2, is applied to an input terminal B of monostable multivibrator 1. Monostable multivibrator 1 is synchronized and triggered by the rising edge of horizontal synchronizing signal H-SYNC and is then disposed to generate a pulse P1, having a pulse width dependent upon a time constant determined by a variable resistor VRI and a capacitor C1, at its output terminal Q. Pulse PI is then applied to input terminal A of monostable multivibrator 2. A falling edge of pulse PI synchronizes and triggers monostable multivibrator 2.

Multivibrator 2 generates a pulse, as a pseudo-horizontal synchronizing signal PH-SYNC, having a pulse width corresponding to a time constant determined by resistor RI and capacitor C2, at it output terminal Q. On this occasion, both values of resistor R1 and capacitor C2 are set to have a time constant so that pseudo-horizontal synchronizing signal PH-SYNC may have the same pulse width W1 as horizontal synchronizing signal H-SYNC upon adjustment of a time constant utilizing variable resistor VR1 by user manipulation, a horizontal synchronizing signal H-SYNC is able to be set with a preferred time delay T1.

Figure 3:
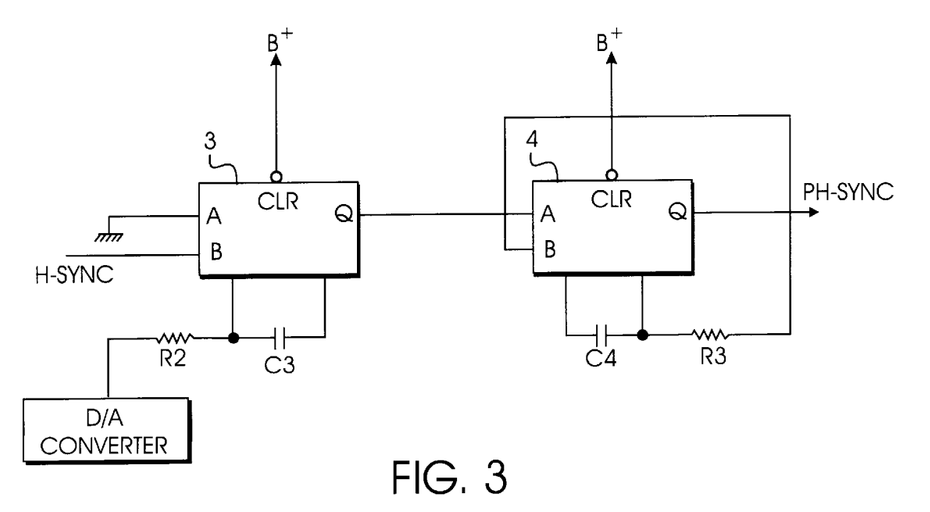
FIG. 3 is a schematic block diagram illustrating another exemple of a pseudo-synchronizing generation circuit utilizing a pair of flip-flops.

A pseudo-synchronizing signal generation circuit, as shown in FIG. 3, incorporates a pair of monostable multivibrators 3 and 4. A digital-to-analog converter D/A converter 5 is further incorporated in the circuit so as to utilize its output voltage in controlling pulse widths of a train of pulses output from multivibrator 3.

The circuitry of FIGS. 1 and 3 lack an effective pseudo-synchronizing signal generator for use with a variety of display apparatuses and each have drawbacks. First, the circuits of FIGS. 1 and 3 are suitable only for those display apparatus having analog electronic circuitry such as a cathode ray tube. It is therefore well known in the art of the circuits for generating pseudo-synchronizing signals as improper to adopt such exemplary circuits as above in a digital signal display apparatus, especially in a liquid crystal display. Upon applying a pseudo-synchronizing signal from an apparatus such as discussed with regard to FIGS. 1–3, an asynchronous phenomenon between a pseudo-synchronizing signal and a video dot clock signal occurs thereby causing a failure in the apparatus. Second, it has been found that it is difficult to achieve a design configuration in an integrated circuit for those exemplary circuits as described owing to employments of such elements as resistors, capacitors and multivibrators.

Figure 4:
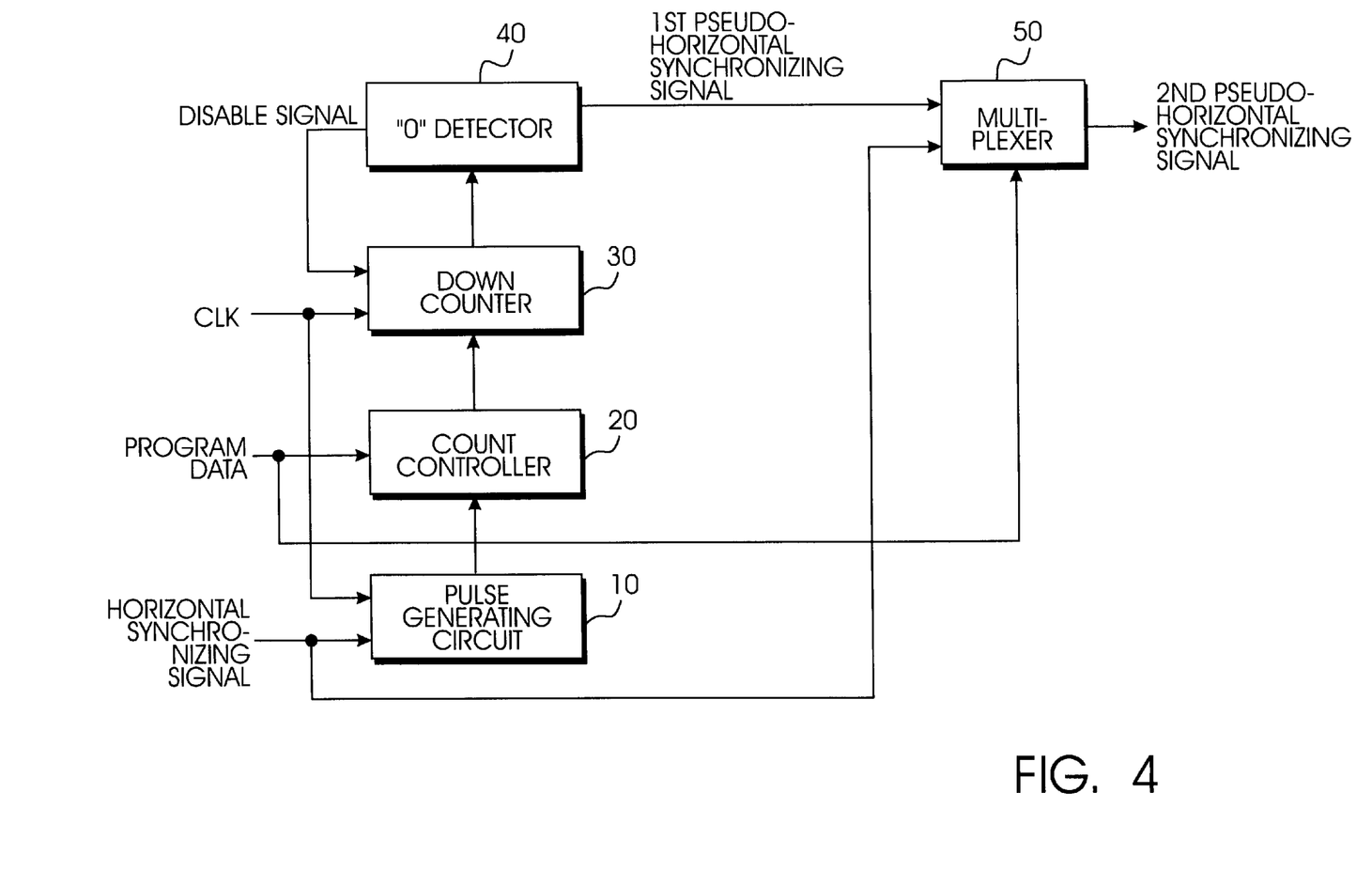
FIG. 4 is a schematic block diagram of a pseudo-synchronizing signal generation circuit for use in a digital image processing apparatus constructed according to the principles of the present invention.

Turning now to FIG. 4, a block diagram of a pseudo-synchronizing signal generation circuit for use in a digital image processing apparatus according to an embodiment of the present invention is shown. Such a circuit can handle either horizontal or vertical synchronizing signals to produce a pseudo-synchronizing signal, as may be required, but for the sake of brevity, the following explanation gives one example; namely, use of a horizontal synchronizing signal. It should be apparent, however, to those skilled in the art that a pseudo-vertical synchronizing signal may wall be produced from construction of a circuit similar to that of FIG. 4. The circuit as shown in FIG. 4 is part of the overall handling of synchronizing signals in the system of the present invention.

In the preferred embodiment as illustrated in FIG. 4, a horizontal synchronizing signal is assumed to be applied from a computer system (not shown). Preferably, a pseudo-synchronizing signal generation circuit for use in a digital image processing apparatus comprises pulse generating circuit 10, count controller 20, down counter 30, "0" detector 40 and multiplexer 50, as described below.

Now, by way of a non-limiting example, an operation of a preferred embodiment of the present invention will be described in greater detail. A train of clock signals CILK is applied to one input terminal of pulse generating circuit 10 and one input terminal of down counter 30. A program data signal is applied at one input terminal of count controller 20 and to a switching control terminal of multiplexer 50.

A synchronizing signal, particularly a horizontal synchronizing signal in this preferred embodiment, is supplied to another input terminal of pulse generating circuit 10 and to an input terminal of multiplexer 50. A signal output from pulse generating circuit 10 is fed to onother input terminal of count controller 20. An enable signal output from count controller 20 is applied to an enable terminal of down counter 30 for enabling down counter 30 to count down from a preset value. A count value output from down counter 30 is applied to "0" detector 40. Upon receiving and detecting a count value of zero from down counter 30, "0" detector 40 outputs a disable signal to down counter 30 and a first pseudo-synchronizing signal to another input terminal of multiplexer 50. Multiplexer 50 selectively outputs one of the received first pseudo-synchronizing signal and horizontal synchronizing signal as a second pseudo-synchronizing signal in response to the program data signal.

Figure 5:
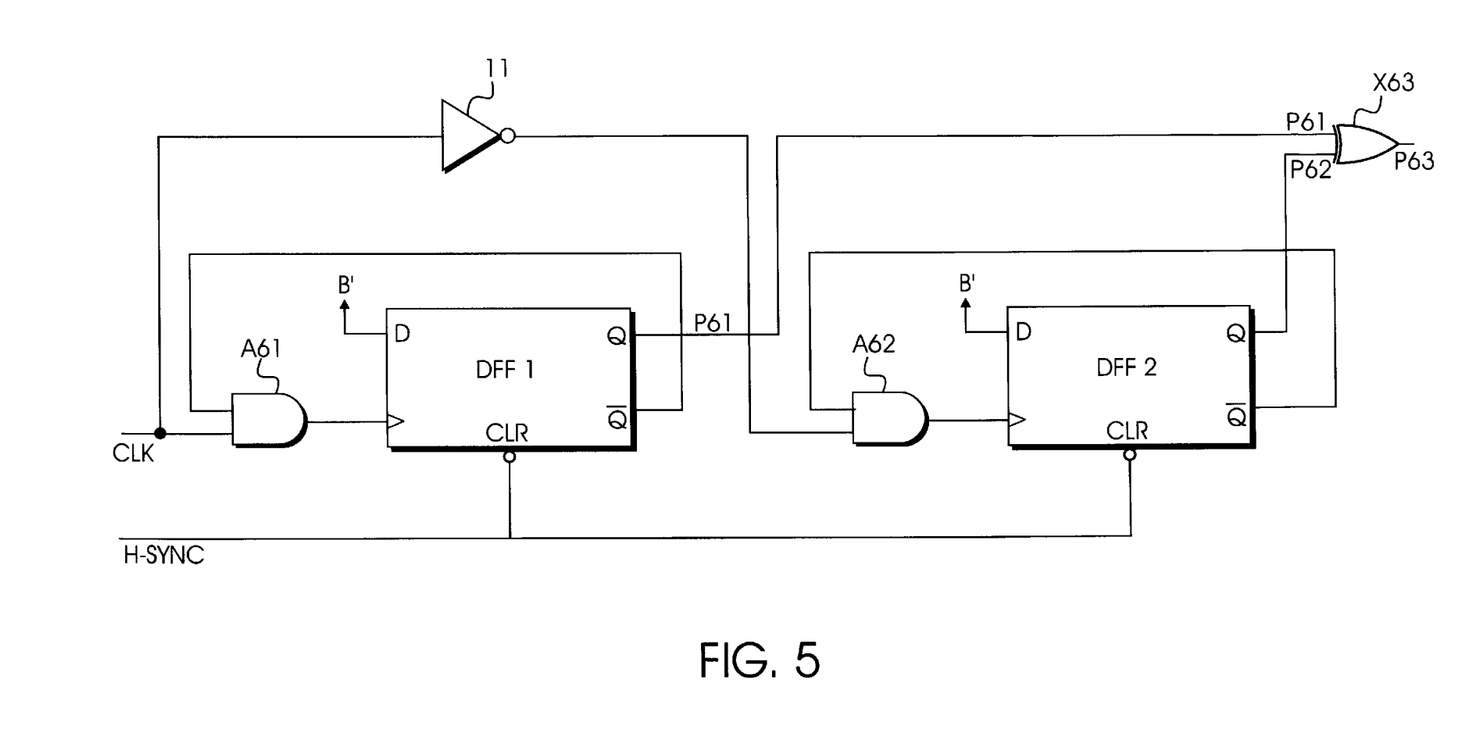
FIG. 5 is a detailed circuit diagram of one preferred embodiment of a pulse generating circuit embodied in the pseudo-synchronizing signal generation circuit of FIG. 4, according to the principles of the present invention.
Figure 6A:
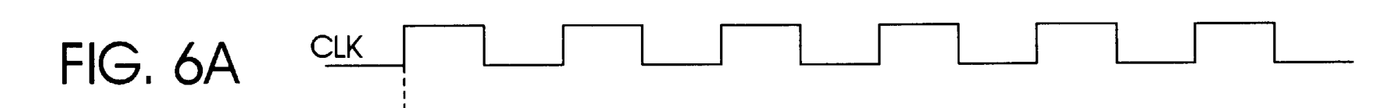
FIG. 6 illustrates various exemplary waveforms taken at various points of the circuit shown in FIG. 5.
Figure 6B:
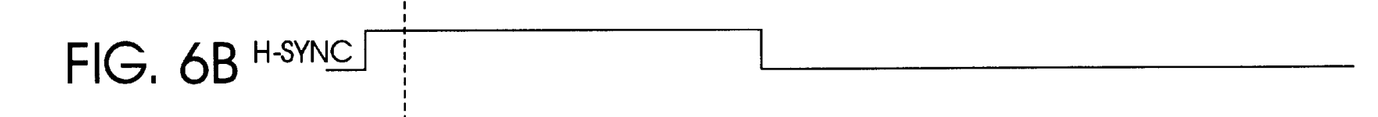
Figure 6C:
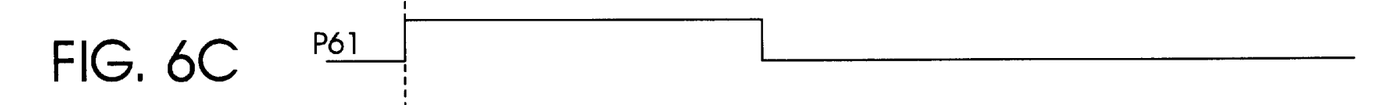
Figure 6D:
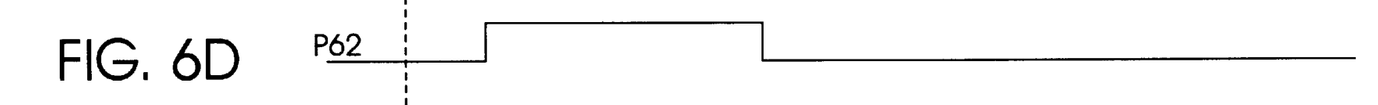
Figure 6E:
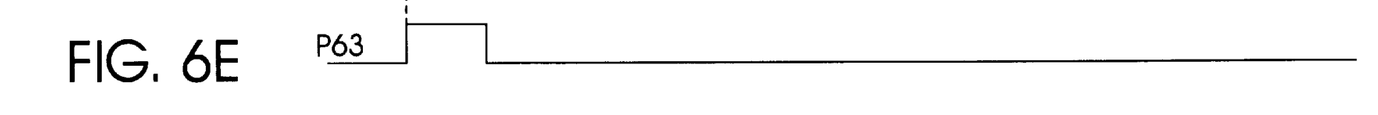

Referring now to FIG. 5, a detailed circuit diagram of one preferred embodiment of pulse generating circuit 10 according to the principles of the present invention is illustrated. Pulse generating circuit 10 comprises a pair of D flip-flops DFF1 and DFF2, both having a clear input terminal CLR so as to receive horizontal synchronizing signal H-SYNC. An AND gate A61 has two input terminals for respectively receiving dot clock signal CLK and an output from the $\overline{Q}$ terminal of D flip-flop DFF1, and an ouput of AND gate A61 is applied to the clock terminal of D flip-flop DFF1. Consequently, D flip-flop DFF1 is synchronized with the rising edge of dot clock signal CLK, during application of horizontal synchronizing signal H-SYNC at its CLR terminal, for generating a pulse P61 of high voltage level at its Q output terminal, as illustrated in FIG. 6.

Additionally, an inverter I1 inverts dot clock signal CLK and applies the inverted clock signal to one input terminal of an AND gate A62 which also receives, at a second input terminal, an output from the $\overline{Q}$ terminal of D flip-flop DFF2. An ouput of AND gate A62 is applied to the clock terminal of D flip-flop DFF2. Consequently, D flip-flop DFF2 is synchronized with the falling edge of dot clock signal CLK, during application of horizontal synchronizing signal H-SYNC at its CLR terminal, for generating a pulse P62 of high voltage level at its Q output terminal, as illustrated in FIG. 6. Further, both the P61 and P62 pulses, respectively output from D flip-flops DFF1 and DFF2, are fed to respective input terminals of an exclusive OR gate X63 which generates a pulse P63 having a half-period with respect to a clock cycle of clock signal CLK, as shown in FIG. 6.

Figure 7:
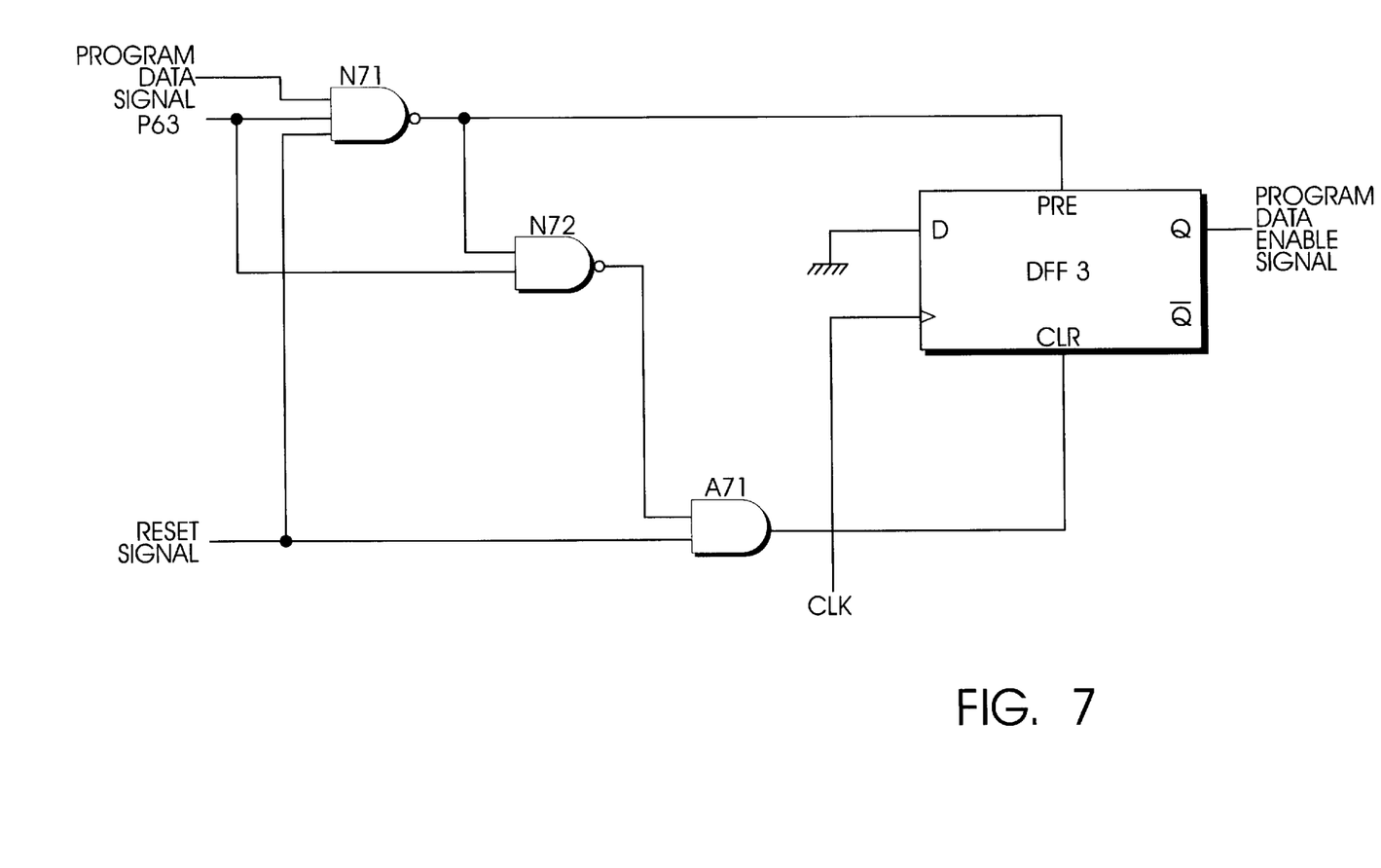
FIG. 7 is a detailed circuit diagram of one preferred embodiment of a counting controller embodied in the pseudo-synchronizing signal generation circuit of FIG. 4, according to the principles of the present invention.

Refering now to FIG. 7, counting controller 20 is described in detail, wherein counting controller 20 synchronizes an input program data signal with pulse P63 and then generates a synchronized program data enable signal at its output terminal. Counting controller 20 incorporates a NAND gate N71 for producing a logical product signal by logically processing the program data signal, a reset signal and pulse signal P63 applied to respective input terminals thereof. A NAND gate N72 is disposed to receive a signal output from NAND gate N71 and pulse signal P63 at respective input terminals thereof for generating a logical product signal at its output terminal. A signal output from NAND gate N72 and the reset signal are applied to respective input terminals of an AND gate A71 for generating a logical product signal at its output terminal.

The signal output from NAND gate N71 is applied to a preset terminal PRE of a D flip-flop DFF3, and the signal output from AND gate A71 is applied to a clear input terminal CLR of D flip-flop DFF3. D flip-flop DFF3, having a clock terminal connected to dot clock signal CLK and a data terminal connected to a ground terminal, generates an output of low voltage level at its Q output terminal when both input terminals PRE and CLR are simultaneously fed with a high level logic signal. When the reset signal, the program data signal and pulse P63 simultaneously have a high voltage level the output of NAND gate N71 will have a low logic level which is applied to the preset terminal PRE of D flip-flop DFF3, the output of NAND gate N72 will have a high logic level, and the output of AND gate A71 will have a high logic level which is applied to the clear terminal CLR of D flip-flop DFF3. When a low logic level signal is applied to terminal PRE and a high logic level is applied to terminal CLR of D flip-flop DFF3, the program data enable signal output from the Q output terminal has a low logic level output. At all other times the program data enable signal output from the Q output terminal of D flip-flop DFF3 will have a high logic level.

Upon applying a program data enable signal of high voltage level from counting controller 20, down counter 30 is enabled to perform down counting operations repeatedly from a preset counting value in synchronization with a train of dot clock signal CLK. On this occasion, "0" detector 40 is enabled to continuously detect a current counting value of down counter 30 so as to detect when the count value becomes zero. Upon detecting a zero count value, "0" detector 40 generates a disable signal to be applied to an input terminal of down counter 30, causing the operation thereof to be disabled, and simultaneously outputs first pseudo-synchronizing signal, i.e., a pseudo-horizontal synchronizing signal, at its output terminal. Accordingly, first pseudo-synchronizing signal output from "0" detector 40 has a delayed wave form with respect to its inherent horizontal synchronizing signal, which is delayed by the time corresponding to the preset counting value of down counter 30.

Multiplexer 50 receives both the horizontal synchronizing signal H-SYNC and first pseudo-horizontal synchronizing signal at respective inputs thereon. When a program data signal of high logic level is applied from an external source to a switching control terminal of multiplexer 50, the first pseudo-synchronizing signal is output as a second pseudo-synchronizing signal, i.e., a second pseudo-horizontal synchronizing signal. When a program data signal of low logic level is applied to the switching control terminal, the horizontal synchronizing signal H-SYNC is output as the second pseudo-synchronizing signal.

While there have been illustrated and described what are considered to be the preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A circuit for receiving a synchronizing signal from an external source, a program data signal and a dot clock signal, said circuit generating a pseudo-synchronizing signal for use in a digital image processing apparatus, said circuit comprising:

a pulse generating circuit receiving said synchronizing signal and said dot clock for generating a pulse of predetermined width in sync with a rising edge of said dot clock;

a counting controller receiving said program data signal, said pulse of predetermined width and a reset signal for generating a program data enable signal;

a down counter receiving said dot clock signal and said program data enable signal, said down counter being disposed to be enabled by said program data enable signal for counting down from a preset counting value in response to said dot clock signal;

a zero detector receiving a current count value of said down counter for detecting when said current count value equals zero, said zero detector simultaneously generating a disable signal and a first pseudo-synchronizing signal upon detection of said zero count value, said disable signal being applied to said down counter for disabling a counting operation; and means for receiving and selectively outputting one of said synchronizing signal and said first pseudo-synchronizing signal as a second pseudo-synchronizing signal in response to said program data signal.

2. The circuit as set forth in claim 1, said pulse generating circuit comprising:

first and second flip-flops, both having a clear terminal for resetting said first and second flip-flops in response to said synchronizing signal;

a first AND gate disposed to receive said dot clock signal and a signal output from a $\overline{Q}$ terminal of said first flip-flop, said first AND gate generating a first logical product signal, said first logical product signal being applied to a clock input terminal of said first flip-flop;

an inverter disposed to produce a inverted dot clock signal by inverting said dot clock signal;

a second AND gate disposed to receive said inverted dot clock signal and a signal output from a $\overline{Q}$ terminal of said second flip-flop at its respective input terminals, said second AND gate generating a second logical product signal, said second logical product signal being applied to a clock input terminal of said second flip-flop; and an exclusive OR gate having a pair of input terminals disposed to receive a signal output from a Q terminal of said first flip-flop and a Q terminal of said second flip-flop, respectively, for generate said pulse of predetermined width.

3. The circuit as set forth in claim 2, said counting controller comprising:

a first NAND gate receiving said program data, said reset signal and said pulse of predetermined width;

a second NAND gate receiving said pulse of predetermined width and an output of said first NAND gate;

a third AND gate receiving said reset signal and an output of said second NAND gate; and a third flip-flop having a data input terminal connected to a ground terminal, a clock terminal receiving said dot clock signal a preset terminal receiving said output of said first NAND gate and a clear terminal receiving an output of said third AND gate, said third flip-flop generating said program data enable signal at its Q output terminal, said program data enable signal having a low logic value when said output of said AND gate received at said clear terminal has a high logic value, said down counter being enabled when said program data enable signal has a high logic value.

4. The circuit as set forth in claim 1, said counting controller comprising:
a first NAND gate receiving said program data, said reset signal and said pulse of predetermined width;
a second NAND gate receiving said pulse of predetermined width and an output of said first NAND gate;
an AND gate receiving said reset signal and an output of said second NAND gate; and
a flip-flop having a data input terminal connected to a ground terminal, a clock terminal receiving said dot clock signal a preset terminal receiving said output of said first NAND gate and a clear terminal receiving an output of said AND gate, said flip-flop generating said program data enable signal at its Q output terminal, said program data enable signal having a low logic value when said output of said AND gate received at said clear terminal has a high logic value, said down counter being enabled when said program data enable signal has a high logic value.

5. The circuit as set forth in claim 1, said means for receiving and selectively outputting one of said synchronizing signal and said first pseudo-synchronizing signal as a second pseudo-synchronizing signal in response to said program data signal comprising a multiplexer.

6. A circuit for receiving a horizontal synchronizing signal from an external source, a program data signal and a dot clock signal, said circuit generating a pseudo-synchronizing signal for use in a digital image processing apparatus, said circuit comprising:
a pulse generating circuit receiving said synchronizing signal and said dot clock for generating a pulse of predetermined width in sync with a rising edge of said dot clock; said pulse generating circuit comprising:
first and second flip-flops, both having a clear terminal for resetting said first and second flip-flops in response to said horizontal synchronizing signal;
a first AND gate disposed to receive said dot clock signal and a signal output from a $\overline{Q}$ terminal of said first flip-flop, said first AND gate generating a first logical product signal, said first logical product signal being applied to a clock input terminal of said first flip-flop;
an inverter disposed to produce a inverted dot clock signal by inverting said dot clock signal;
a second AND gate disposed to receive said inverted dot clock signal and a signal output from a $\overline{Q}$ terminal of said second flip-flop at its respective input terminals, said second AND gate generating a second logical product signal, said second logical product signal being applied to a clock input terminal of said second flip-flop; and
an exclusive OR gate having a pair of input terminals disposed to receive a signal output from a Q terminal of said first flip-flop and a Q terminal of said second flip-flop, respectively, for generate said pulse of predetermined width;
a counting controller receiving said program data signal, said pulse of predetermined width and a reset signal for generating a program data enable signal;

a down counter receiving said dot clock signal and said program data enable signal, said down counter being disposed to be enabled by said program data enable signal for counting down from a preset counting value in response to said dot clock signal;
a zero detector receiving a current count value of said down counter for detecting when said current count value equals zero, said zero detector simultaneously generating a disable signal and a first pseudo-synchronizing signal upon detection of said zero count value, said disable signal being applied to said down counter for disabling a counting operation; and
means for receiving and selectively outputting one of said horizontal synchronizing signal and said first pseudo-synchronizing signal as a second pseudo-synchronizing signal in response to said program data signal.

7. The circuit as set forth in claim 6, said counting controller comprising:
a first NAND gate receiving said program data, said reset signal and said pulse of predetermined width;
a second NAND gate receiving said pulse of predetermined width and an output of said first NAND gate;
a third AND gate receiving said reset signal and an output of said second NAND gate; and
a third flip-flop having a data input terminal connected to a ground terminal, a clock terminal receiving said dot clock signal a preset terminal receiving said output of said first NAND gate and a clear terminal receiving an output of said third AND gate, said third flip-flop generating said program data enable signal at its Q output terminal, said program data enable signal having a low logic value when said output of said AND gate received at said clear terminal has a high logic value, said down counter being enabled when said program data enable signal has a high logic value.

8. The circuit as set forth in claim 7, said means for receiving and selectively outputting one of said horizontal synchronizing signal and said first pseudo-synchronizing signal as a second pseudo-synchronizing signal in response to said program data signal comprising a multiplexer.

9. A method for generating a pseudo-synchronizing signal, for use in a digital image processing apparatus, in response to the receipt of a synchronizing signal from an external source, a program data signal and a dot clock signal, said method comprising the steps of:
generating a pulse of predetermined width in sync with a rising edge of said dot clock signal while receiving said synchronizing signal;
generating a program data enable signal in response to said program data signal, said pulse of predetermined width and a reset signal;
counting down from a preset counting value in response to said dot clock signal in response to said dot clock signal and said program data enable signal;
detecting when a current count value of said step of counting down equals zero;
simultaneously generating a disable signal and a first pseudo-synchronizing signal upon detection of a zero count value, said disable signal being utilized for disabling said step of counting down; and
selectively outputting one of said synchronizing signal and said first pseudo-synchronizing signal as a second pseudo-synchronizing signal in response to said program data signal.

* * * * *